United States Patent [19]
Shiotsuki et al.

[11] Patent Number: 5,436,956
[45] Date of Patent: Jul. 25, 1995

[54] METHOD AND ARRANGEMENT FOR REDUCING THE NUMBER OF HANDOFF REQUESTS IN A CELLULAR MOBILE COMMUNICATIONS SYSTEM

[75] Inventors: Hirofumi Shiotsuki; Eiki Katsuoka, both of Tokyo, Japan

[73] Assignee: NEC Corporation, Tokyo, Japan

[21] Appl. No.: 92,893

[22] Filed: Jul. 19, 1993

[30] Foreign Application Priority Data

Jul. 17, 1992 [JP] Japan .................................. 4-190562

[51] Int. Cl.[6] ............................................. H04Q 7/22
[52] U.S. Cl. ......................................... 379/60; 379/58; 455/33.2
[58] Field of Search ................... 379/58, 60; 455/33.2; 375/1

[56] References Cited

U.S. PATENT DOCUMENTS

| | | | |
|---|---|---|---|
| 4,670,899 | 6/1987 | Brody et al. | 379/60 |
| 5,146,609 | 9/1992 | Tayloe et al. | 455/33.2 |
| 5,239,667 | 8/1993 | Kanai | 455/33.2 |
| 5,239,675 | 8/1993 | Dudczak | 455/33.2 |
| 5,267,261 | 11/1993 | Blakeney, II et al. | 375/1 |
| 5,289,525 | 2/1994 | Issenman et al. | 379/58 |
| 5,303,289 | 4/1994 | Quinn | 379/60 |
| 5,313,489 | 5/1994 | Menich et al. | 375/1 |

FOREIGN PATENT DOCUMENTS 2262688 6/1903 United Kingdom .
2240696 8/1991 United Kingdom .

OTHER PUBLICATIONS

Kanai, Take Tsugu, Kondo, "Experimental Digital Cellular System for Microcellular Handoff", IEEE, May 6, 1990.

*Primary Examiner*—Curtis Kuntz
*Assistant Examiner*—William Cumming
*Attorney, Agent, or Firm*—Sughrue, Mion, Zinn, Macpeak & Seas

[57] ABSTRACT

In order to effectively control a time interval of issuing a handoff request from a land site in a mobile communications system, a strength of a signal which is transmitted from a mobile unit located in a service area of said land site, is measured at the land side. A level crossing rate is measured based on the signal transmitted from the mobile unit. A first handoff request is generated if the signal strength falls below a predetermined handoff threshold. Following this, a timer is rendered active for counting an elapsed time after the first handoff request is generated. If the signal strength is detected below the predetermined handoff threshold, a time interval is determined based on the level crossing rate. The relationship between the time interval and the level crossing rate has been previously determined. Thereafter, a second handoff request is generated if the time interval determined in the above exceeds the elapsed time. subsequently, the timer is reset and then the above operations are repeated.

13 Claims, 6 Drawing Sheets

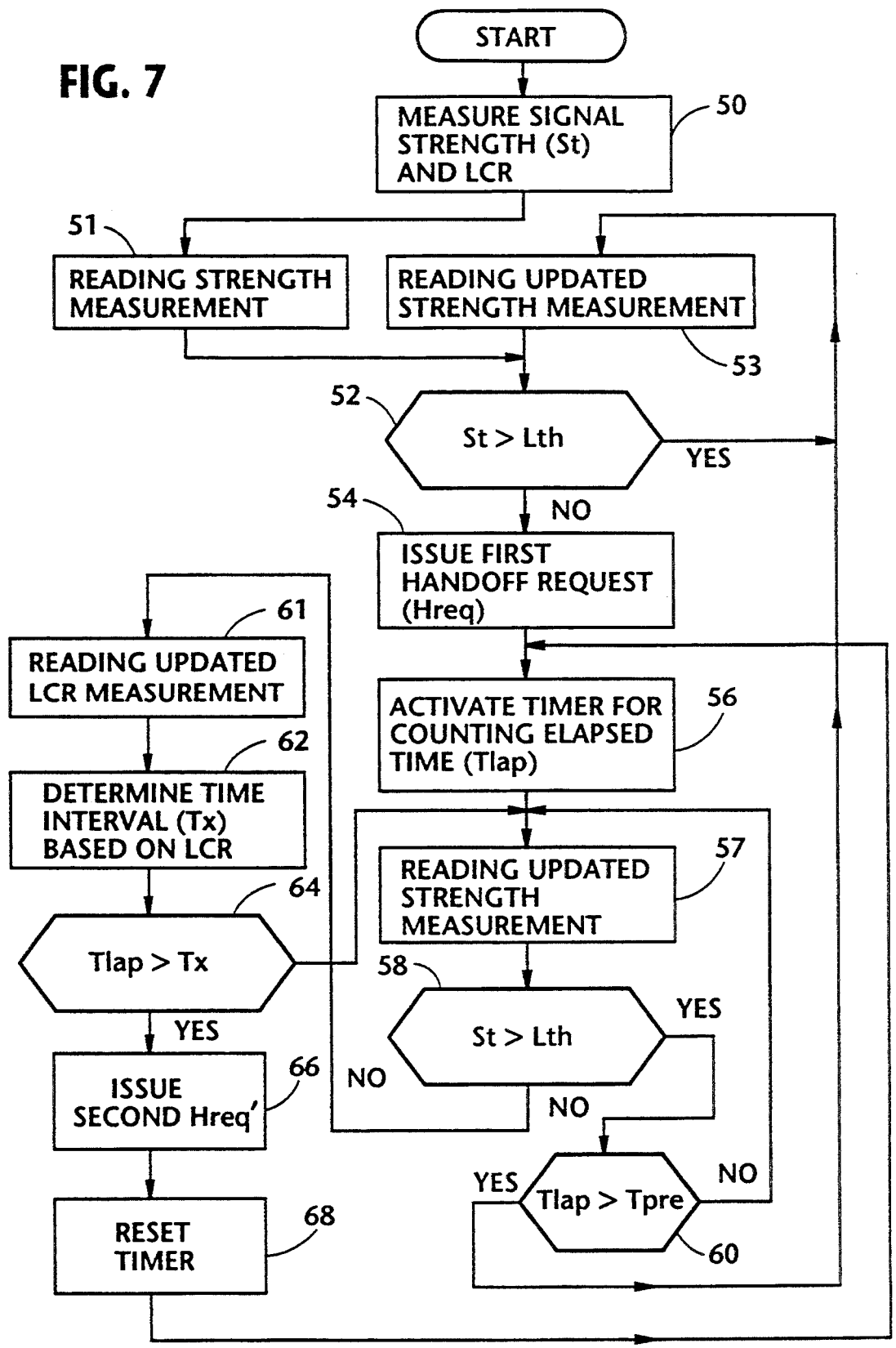

METHOD AND ARRANGEMENT FOR REDUCING THE NUMBER OF HANDOFF REQUESTS IN A CELLULAR MOBILE COMMUNICATIONS SYSTEM

BACKGROUND OF THE INVENTION

1. Field of the Invention

The present invention generally relates to improvements in a cellular mobile communications system and, more specifically, to a method and arrangement for controlling handoff in a cellular mobile communications system. The present invention is characterized in that the number of handoff requests can effectively be reduced as compared with known techniques.

2. Description of Related Art

It is well known in the art to apply frequency reuse in a mobile communications system in order to satisfy various objectives such as large subscriber capacity, efficient spectrum use, widespread availability, adaptability to traffic density, etc.

Frequency reuse refers to the use of the same radio carrier frequency in a number of different channels to cover different areas which are separated from one another by distances sufficient that objectionable co-channel interference does not occur. The so called cellular mobile communications system utilizes such a concept.

When a mobile unit, during a call, moves out of the service coverage of a particular land site, the signal strength measured at the particular land site falls below a handoff threshold level. Thus, the present land site requests an MTSO (Mobile Telephone Switching Office) to implement a handoff or switch over the mobile unit to another suitable nearby land site. The MTSO, in response to the handoff request, instructs the neighboring land sites to measure the strength of the signal transmitted from the mobile unit to be handed off.

After each of the nearby land sites completes measuring the signal strength of the mobile unit to be handed off, it informs the MTSO of the results. The MTSO checks the results which are received and then implements a handoff if there is a land site to which the mobile unit can be suitably handed off. Otherwise, the handoff is not carried out.

Accordingly, if a handoff is not carried out and if the signal strength measured at the land site with which the mobile unit has established a call, is still below the handoff threshold, then the land site again generates a handoff request to the MTSO after a predetermined time interval. If these conditions continue, the land site repeatedly sends handoff requests to the MTSO at the above-mentioned predetermined time interval. This time interval has been selected to meet severe conditions as when a mobile unit moves at a high speed from cell to cell without cutting off transmission.

The above-mentioned related art however, suffers from the following problems. For example, a wastefully large number of handoff requests is transmitted when a mobile unit moves at a low speed in the vicinity of a cell boundary. Since the time interval of issuing the requests is fixed to a short term as mentioned above, handoff requests are frequently sent to the MTSO although a handoff is not or can not be achieved.

Further, in the case where a hand-held mobile unit is used in a building or the like, the strength of the signal transmitted to a land site from the mobile unit is likely to be below the handoff threshold even though the building is located in a good service area. In this instance, the land site detects the signal strength being below the handoff threshold and thus sends handoff requests to the MTSO at the predetermined time intervals irrespective of the fact that the hand-held mobile unit will almost certainly not be handed off to any other land site. The generation of such frequent handoff requests from the hand-held mobile units at short time intervals, induces serious saturation problems (for example) as the number of subscribers using hand-held mobile units has greatly increased in recent years.

Still further, in order to meet the ever increasing number of subscribers, subdividing each of the cells into smaller ones tends to greatly increase the total number of handoff requests. Accordingly, each of the land sites is undesirably required to be equipped with sophisticated and expensive instruments for measuring signal strength in response to the requests from the MTSO. In addition to this, the MTSO is also required to handle an ever larger number of handoff requests.

It is therefore highly desirable to reduce the number of handoff requests in order to lessen the burden on the land sites as well as the MTSO in terms of the number of handoff operations and the complex hardware requirements associated therewith.

SUMMARY OF THE INVENTION

It is an object of the present invention to provide a method for effectively reducing the number of handoff requests from a land site to a MTSO.

Another object of the present invention is to provide a method for effectively reducing the number of handoff requests utilizing a level crossing rate derived at a land site.

Still another object of the present invention is to provide a hardware arrangement for effectively reducing the number of handoff requests from a land site to the MTSO.

Still another object of the present invention is to provide a hardware arrangement for effectively reducing the number of handoff requests utilizing level crossing rate derived at a land site.

In brief, these objects are achieved by improvements wherein a time interval of issuing a handoff request from a land site is effectively controlled. A strength of a signal, transmitted from a mobile unit located in a service area of the land site, is measured at the land side. A level crossing rate is measured based on the signal transmitted from the mobile unit. A first handoff request is generated if the signal strength falls below a predetermined handoff threshold. Following this, a timer is rendered active for counting time after the first handoff request is generated. If the signal strength is detected below the predetermined handoff threshold, a time interval is determined based on the level crossing rate. The relationship between the time interval and the level crossing rate has been previously determined. Thereafter, a second handoff request is generated if the time interval determined in the above exceeds the elapsed time. Subsequently, the timer is reset and then the above operations are repeated.

More specifically an aspect of the present invention resides in a method of controlling a time interval of issuing a handoff request from a land site in a mobile communications system. The handoff request is sent to a MTSO (Mobile Telephone Switching Office). The method comprises the steps of: (a) measuring a strength of a signal transmitted from a mobile unit located in a service area of the land site; (b) measuring a level crossing rate based on the signal transmitted from the mobile unit; (c) generating a first handoff request if the strength of the signal falls below a predetermined handoff threshold; (d) activating a timer for counting an elapsed time in response to the generation of the first handoff request; (e) determining a time interval based on the level crossing rate if the strength of the signal is detected below the predetermined handoff threshold; (f) generating a second handoff request if the time interval determined at step (e) exceeds the elapsed time; and (g) resetting the timer.

Another aspect of the present invention resides in a hardware arrangement for controlling a time interval of issuing a handoff request from a land site in a mobile communications system. The handoff request is sent to a MTSO. The hardware arrangement comprises: first means for measuring a strength of a signal transmitted from a mobile unit located in a service area of the land site; second means for measuring a level crossing rate based on the signal transmitted from the mobile, the first means generating a first handoff request if the strength of the signal falls below a predetermined handoff threshold; and third means for counting an elapsed time in response to the generation of the first handoff request, wherein the second means determines a time interval based on the level crossing rate if the strength of the signal is detected below the predetermined handoff threshold, and wherein the second means generates a second handoff request if the time interval determined exceeds the elapsed time and subsequently resets the third means.

BRIEF DESCRIPTION OF THE DRAWINGS

The features and advantages of the present invention will become more clearly appreciated from the following description taken in conjunction with the accompanying drawings in which like elements are denoted by like reference numerals and in which:

FIGS. 6 and 7 are flow charts which depict the operations which characterized the present invention.

DETAILED DESCRIPTION OF THE PREFERRED EMBODIMENTS

Figure 1:
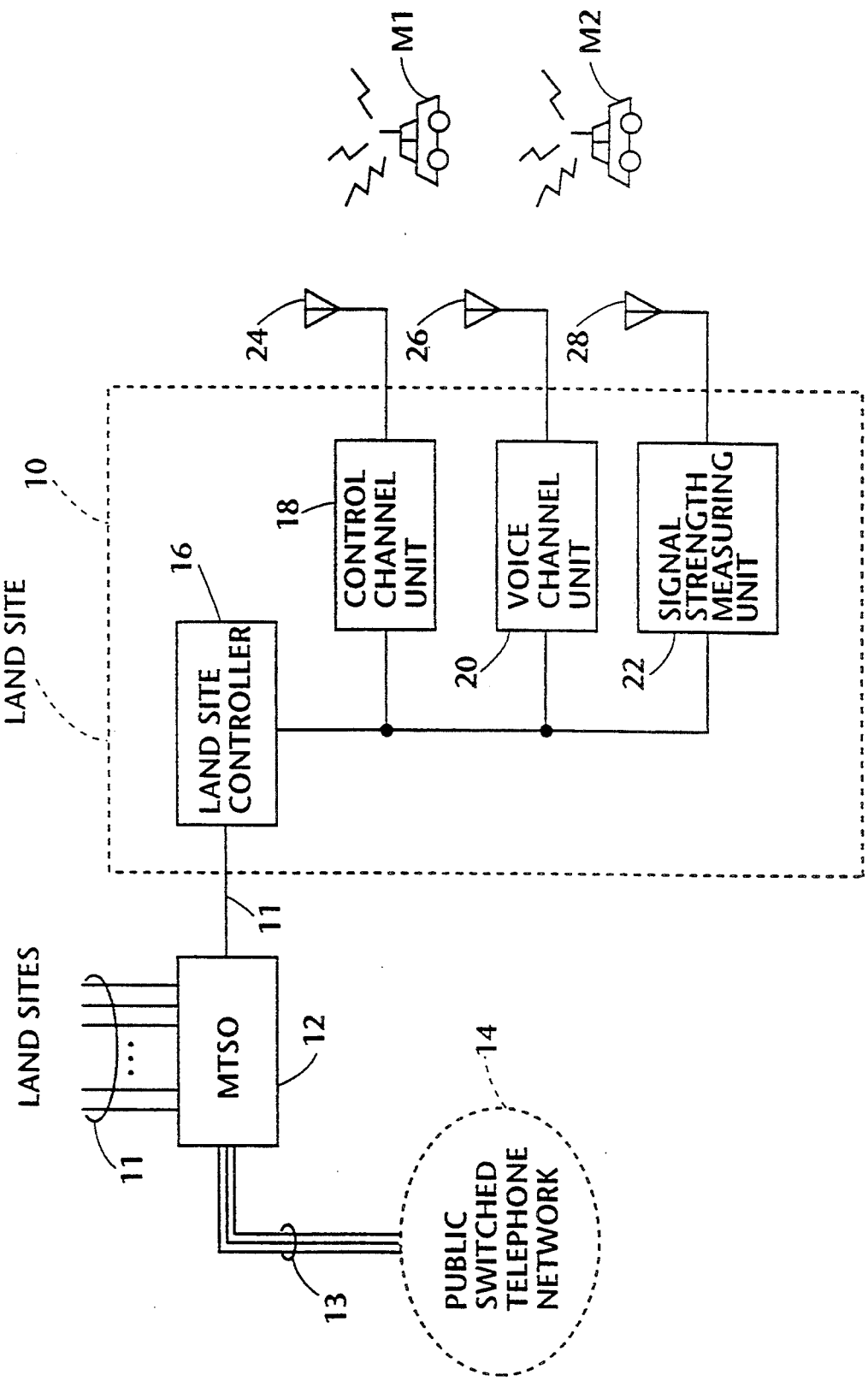
FIG. 1 is a block diagram showing a land site to which the present invention is applicable and the arrangements associated therewith.

Referring now to FIG. 1, wherein a land site 10, to which the present invention is applicable, is shown in block diagram form together with a MTSO 12, a public switched telephone network 14, and mobile units M1 and M2.

The present invention is to reduce the number of the handoff requests from the land site 10 to the MTSO 12 after detecting a strength of a signal from a mobile unit located in the service area thereof.

Land sites, including the land site 10, are connected by land lines 11 to the MTSO 12 which is in turn connected by trunks 13 to the public switched telephone network 14. Each of the land lines 11 includes control and voice channels. The MTSO 12 supervises and controls the entire operation of the system, including the assignment of voice channels and the changing of frequencies during a handoff.

If the mobile unit M1 (for example) wishes to make a call with a party in the public switched telephone network 14 or another mobile unit, the call is established using the land site controller 16 and the control channel unit 18 under the control of the MTSO 12. Following this, speech is made possible via the voice channel 20.

It is assumed that: (a) a mobile unit (not shown) located in a given land site (denoted by $LS_x$ for the convenience of description) requires "handing off" and (b) the land site 10 is adjacent the land site $LS_x$. The MTSO 12 receives a handoff request sent from the land site $LS_x$. Subsequently, the MTSO 12 instructs the land site 10 to measure the strength level of a signal received from the mobile unit in the nearby land site $LS_x$. The land site controller 16, in response to the signal strength measurement instructions from the MTSO 12, induces the unit 22 to measure the signal strength. The measurement result obtained at the unit 22 is fed back to the MTSO 12 via the land site controller 16.

The unit 22 is provided to measure the signal strength in the case where the MTSO 12 receives a handoff request from a land site other than the land site 10 and therefore, is not particularly concerned with the present invention.

On the other hand, the present invention is directly concerned with the voice channel unit 20 by which the number of the handoff requests to be applied to the MTSO 12 via the controller 16 can effectively be reduced. The voice channel unit 20 is shown in detail in FIG. 5.

Figure 5:
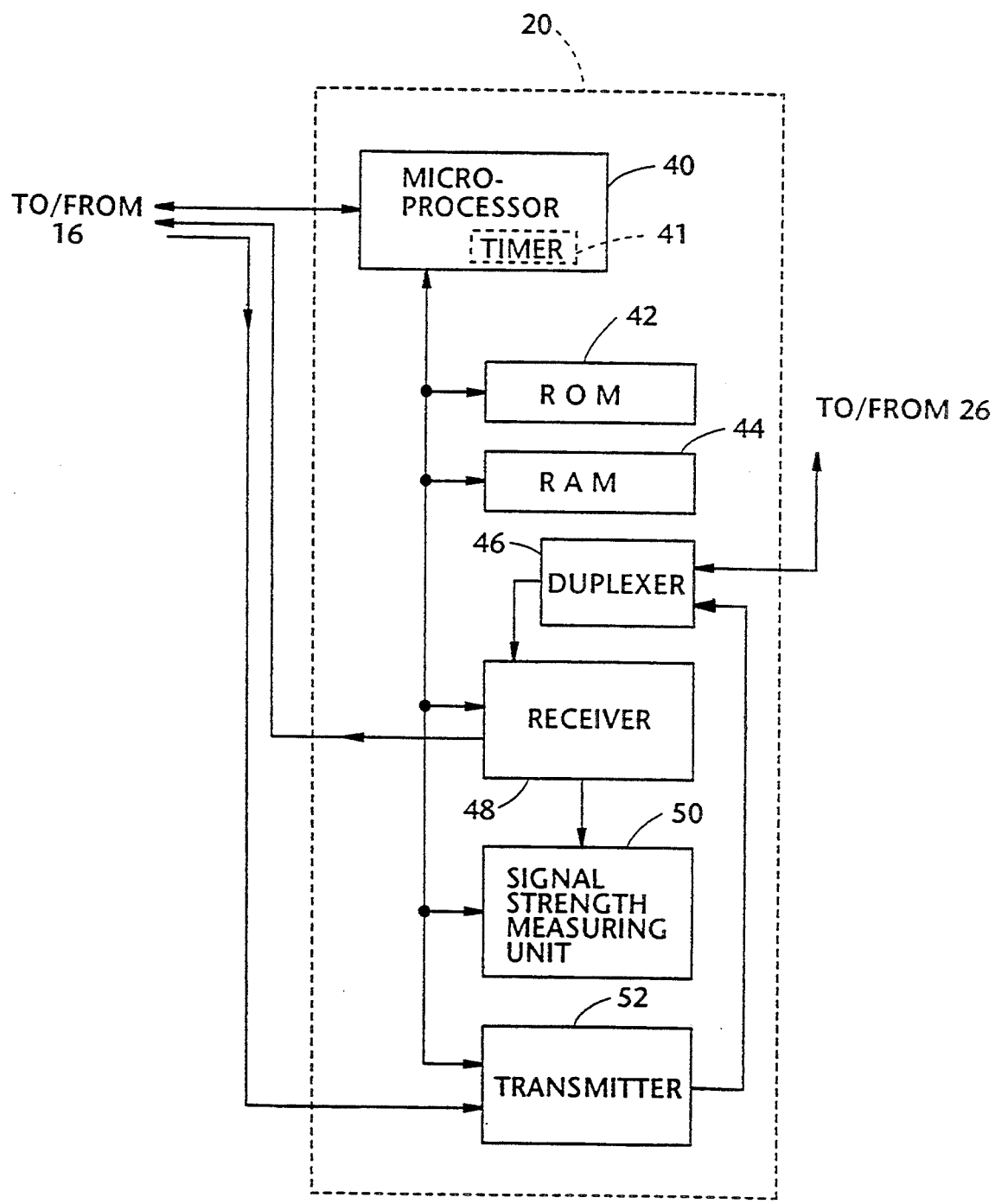
FIG. 5 is a block diagram showing in detail one of the blocks shown in FIG. 1, which block is directly concerned with the present invention.

Before turning to the embodiment of the present invention shown in FIG. 5, it is deemed advantageous to first discuss the principle underlying the present invention.

Figure 2:
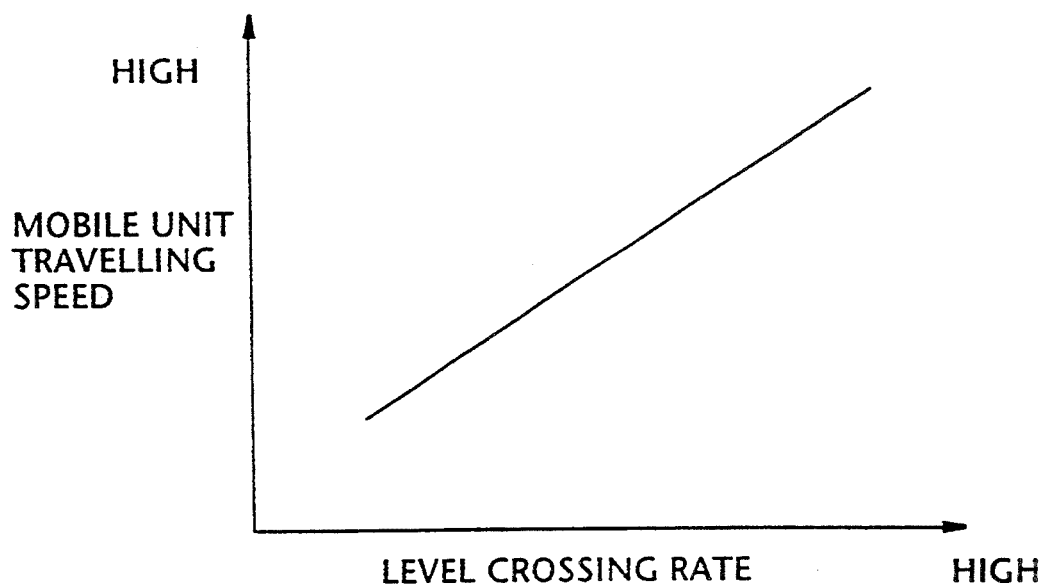
FIGS. 2 to 4 depict graphical data which demonstrate the principle underlying the present invention.

FIG. 2 is a plot schematically showing the relationship between the level crossing rates and the mobile unit travelling speed. As is well known in the art, the level crossing rate at a specified signal level is defined as the average number of times per second that the signal envelop crosses the level in a positive-going direction. Further, it is known that the level crossing rate is proportional to the mobile unit travelling speed, as shown in FIG. 2. In this case, it should be noted that the relationship of FIG. 2 can be applied to any direction of mobile unit travel (movement).

Figure 3:
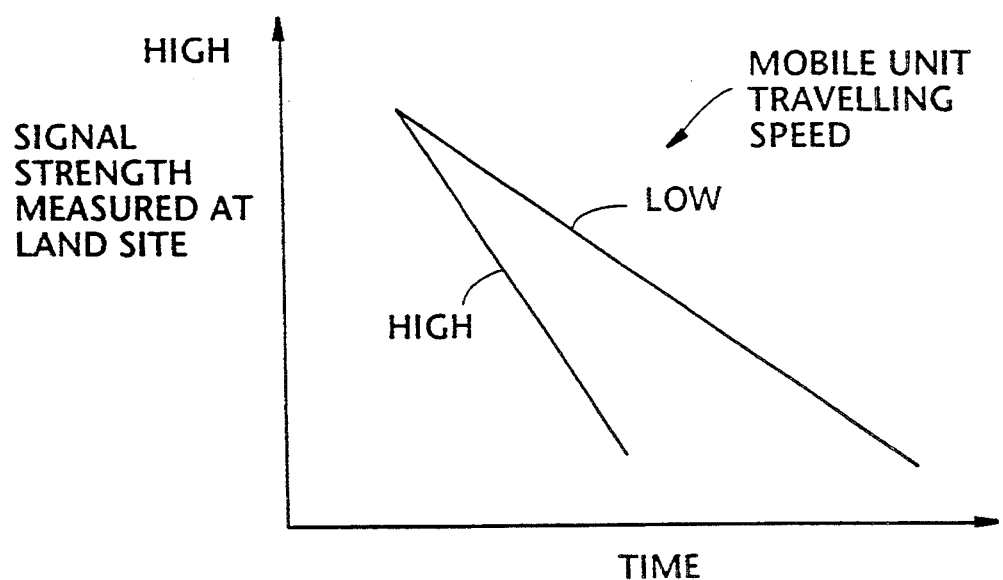

When a mobile unit moves away from a land site at a constant speed, the signal strength measured at the land site reduces in a manner proportional to the elapsed time. As shown in FIG. 3, if the mobile unit moves at a high speed, the signal strength detected at the land site decreases steeply (denoted by HIGH) as compared with the case where the mobile unit travels at a low speed. By way of example, the less inclined slope LOW indicates the reduction in signal strength in the instance the mobile unit moves away from the land site at a low speed.

It is therefore understood that if a mobile unit moves at a high speed, it is necessary to shorten the time interval of generating handoff requests. Contrarily, if the mobile unit travels at a low speed, the time interval can be relatively long.

As mentioned above, the relationship shown in FIG. 2 can be applied to the case where a mobile unit approaches the land site. However, in this case, the signal strength detected by the land site gradually increases. Thus, even though a handoff request(s) has been previously generated, the conditions which requires handoff may actually diminish as the mobile unit moves closer to the land site.

FIG. 5 shows, in block diagram form, the details of the voice channel unit 20 which is directly concerned with the embodiment of the present invention.

As shown in FIG. 5, the unit 20 includes a microprocessor 40, a ROM (Read Only Memory) 42, a RAM (Random Access Memory) 44, a duplexer 46, a receiver 48, a signal strength measuring unit 50, and a transmitter 52, all of which are coupled as shown. The microprocessor 40 is provided with a timer 41. The blocks 40, 48 and 52 are coupled to the land site controller 16 (FIG. 1), while the duplexer 46 is coupled to the antenna 26 (FIG. 1).

Merely for the convenience of exemplary description, let it be assumed that the mobile unit M1 is to be handed off to a given nearby land site (not shown).

The microprocessor 40 controls the overall operations of the voice channel unit 20 using a program stored in the ROM. In the preferred embodiment shown in FIG. 5, the microprocessor 40 measures the level crossing rate based on the intensity of the signal which is transmitted from the mobile unit M1 and detected at the measuring unit 50. Measuring the level crossing rate itself is well known in the art and hence the description thereof will be omitted for the sake of brevity. The RAM 44 is used as a working memory when determining the level crossing rate and storing intermediate results during the operations. The transmitter 52 is not directly related to the instant invention and as such the discussion thereof will also be omitted.

The operations of the voice channel unit 20 shown in FIG. 5 will be described with reference to the flow chart of FIG. 6.

Figure 4:
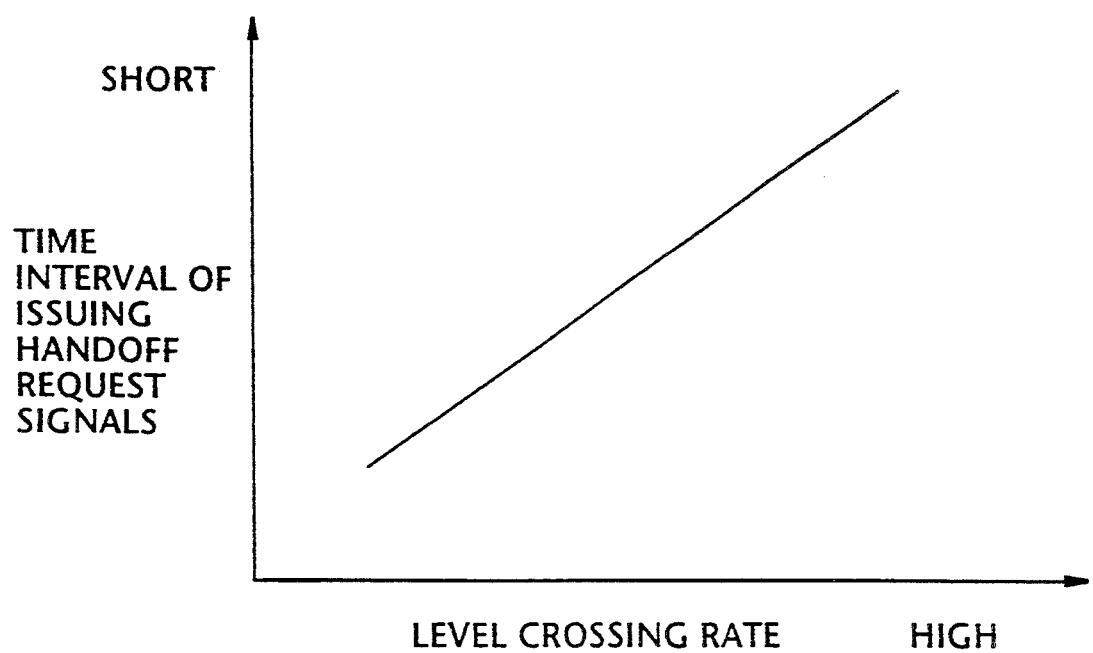

Prior to the land site 10 being brought into operation, the relationship between the intervals of issuing handoff requests and the level crossing rate (FIG. 4), is determined by way of empirical data derived by field work investigation or practical measurements. The results thus obtained are stored in the ROM 42 in the form of a look-up table (for example). It is important to exactly define the longest time interval, which is practically acceptable, in the case where the level crossing rate exhibits a low value. In more specific terms, it is vital not to erroneously cut off the voice channel in use while carrying out the handoff with a mobile unit which is stationary or is moving slowly.

As mentioned above, it is assumed that: (a) the mobile unit M1 is moving away from the land site 10 (FIG. 1) while establishing a call with the same, and (b) the mobile unit M1 is subjected to conditions which require handoff to another suitable nearby land site (not shown). Further, during the operations characterized by the flow charts shown in FIGS. 6 and 7, it is assumed that the land site 10 receives no information from the MTSO 12 that handoff is completed.

At the first step (step 50) of the routine, the intensity of the voice signal transmitted from the mobile unit M1 is measured at the signal strength measuring unit 50. In more specific terms, the receiver 48 is supplied with the incoming signal via the duplexer 46 and applies an IF (Intermediate Frequency) signal to the unit 50 at which the signal strength is detected in a conventional manner. The microprocessor 40 receives the detected signal strength (St) from the unit 50 and then determines the level crossing rate (LCR) according to a known scheme. It should be noted that St and LCR are constantly measured while the land site 10 communicates with a mobile unit(s) located in the service area thereof.

At step 52, the signal strength, read in step 51, St is compared with a predetermined handoff threshold level Lth. The comparison is carried out by the microprocessor 40. If St>Lth then step 52 is again implemented. Otherwise (viz., in the case of St≦th), the routine flows to step 54 wherein the microprocessor 40 issues a handoff request (Hreq) which is relayed to the MTSO 12 via the land site controller 16. Thus, the MTSO 12 instructs nearby land sites to measure the intensity of the signal from the mobile unit M1. The measuring of the signal strength at the nearby land sites is not relevant to the instant invention and thus the discussion thereof will be omitted for brevity.

Subsequently, at step 56, the timer 41 is rendered active to count elapsing time (the counted, or elapsed time, is depicted by Tlap) immediately after the issuance of the handoff request at step 54. Following this, the routine flows to step 58 wherein the signal strength most recently detected at step 50 and read at step 57 is compared with the handoff threshold level Lth. The elapsed time Tlap and the threshold level Lth, are stored in the RAM 44. Although the microprocessor 40 is provided with the timer 41 in this particular embodiment, it is within the scope of this invention to provide a timer which is separate from or independent of the microprocessor 40.

If St>Lth at step 58, the routine goes to step 60 wherein the elapsed time Tlap is compared with a predetermined time duration Tpre which is previously stored in the RAM 44. If Tlap≦Tpre then the routine flows back to step 57, while if Tlap>Tpre the routine goes back to step 53. The reason for providing the time duration Tpre is that if the signal strength St exceeds the threshold Lth for a predetermined duration after the first handoff request Hreq is generated, then the handoff requesting operation is cleared. Tpre may empirically be determined depending on the mobile communications systems.

If St≦Lth at step 58, the routine flows to step 62 wherein a time interval (Tx) of issuing the second handoff request (depicted by Hreq') from the generation of the first one (Hreq) is determined based on the level crossing rates (LCR). The time interval Tx may be stored in the RAM 44 or a suitable memory provided in the microprocessor 40. As mentioned above, the measuring of LCR is constantly implemented while the land site 10 communicates with the mobile unit M1 in this particular case. Further, the relationship shown in FIG. 4 has been stored in the ROM 42. Still further, if LCR is high then the time interval Tx is rendered short and vice cersa.

Subsequently, at step 64, the elapsed time Tlap is compared with the time interval Tx. If Tlap≦Tx then the routine goes to step 57. Otherwise (viz., Tlap>Tx), at step 66, the microprocessor 40 issues the second handoff request Hreq' which is applied to the MTSO 12 via the land site controller 16. Then, the timer is reset at step 68 after which the routine flows to step 53.

Figure 6:
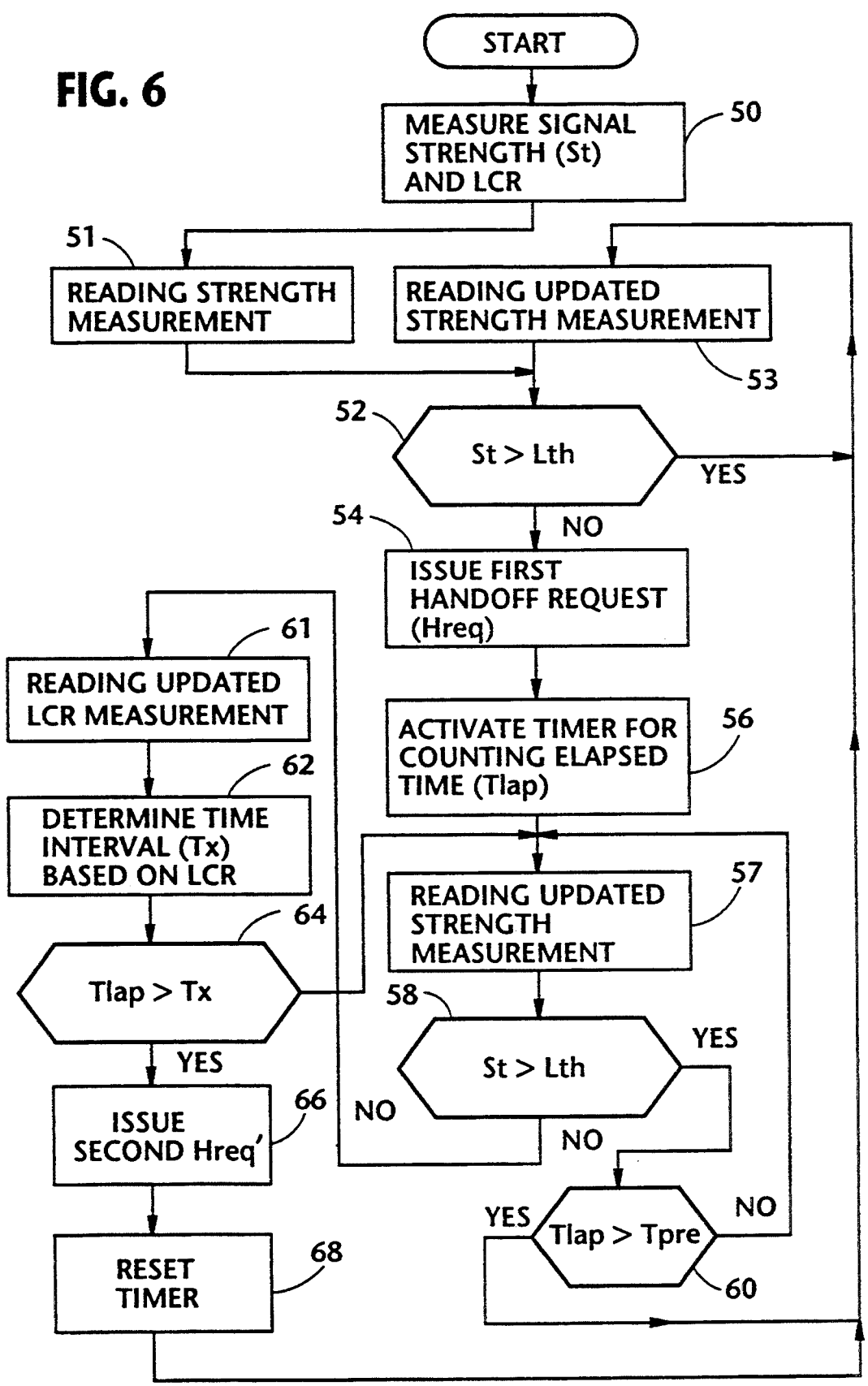

FIG. 7 shows a flow chart which is the variant of that illustrated in FIG. 6. As shown in FIG. 7, after the time is reset at step 68, the routine goes back to step 56. Other than this, the flow chart of FIG. 7 is identical to that of FIG. 6.

It will be understood that the above disclosure is representative of only two possible embodiments and that various modifications can be made without departing from the concept of the invention.

What is claimed is:

1. A method of controlling a handoff request operation in a land site in a mobile communications system, said handoff request being sent to an MTSO (Mobile Telephone Switching Office), said method comprising the steps of:
   (a) measuring a strength of a signal transmitted from a mobile unit located in a service area of said land site;
   (b) measuring a level crossing rate based on said signal transmitted from said mobile unit;
   (c) generating a handoff request if said strength of the signal falls below a predetermined handoff threshold;
   (d) activating a timer for counting elapsing time in response to the generation of said first handoff request;
   (e) reading an updated strength measurement and an updated level crossing measurement of said signal;
   (f) determining a time interval based on said updated level crossing rate if said updated strength of the signal is detected to be below said predetermined handoff threshold;
   (g) generating a subsequent handoff request if the time counted by said timer exceeds said time intervals determined at step (f); and
   (h) resetting said timer.

2. A method as claimed in claim 1, further comprising a step of providing a predetermined relationship between said time interval and said level crossing rate.

3. A method as claimed in claim 1, wherein the strength of said signal is measured as long as said signal is transmitted from said mobile unit.

4. A method as claimed in claim 1, wherein step (e) is repeated whenever said updated strength of the signal is detected to be above said predetermined handoff threshold and said counted elapsing time is smaller than a predetermined time duration.

5. A method as claimed in claim 1, wherein step (a) is repeated after said timer is reset.

6. A method as claimed in claim 1, wherein step (e) is repeated after said time is reset.

7. A management system for controlling a time interval of issuing a handoff request from a land site in a mobile communications system, said handoff request being sent to MTSO (Mobile Telephone Switching Office), said management system comprising:
   a signal strength means for measuring a strength of a signal transmitted from a mobile unit located in a service area of said land site, and generating a handoff request when the measured strength of the signal is below a predetermined handoff threshold;
   a level crossing rate means for measuring a level crossing rate based on said signal transmitted from said mobile unit; and
   a counter for counting elapsing time in response to the generation of said handoff request;
   wherein said level crossing rate means determines a time interval based on said level crossing rate if the strength of the signal is detected to be below said predetermined handoff threshold, and wherein said level crossing rate means generates a subsequent handoff request if said time interval exceeds said counted elapsing time, and subsequently resets said counter.

8. The management system as claimed in claim 7, further comprising a predetermined relationship between said time interval and said level crossing rate.

9. The method according to claim 1, wherein step (e) is repeated whenever said counted elapsing time is less than said time interval determined in step (f) and said updated strength of the signal is detected to be below said predetermined handoff threshold.

10. The method according to claim 1, further comprising
    providing a predetermined upper time interval limit; and
    wherein the time interval determined in step (f) does not exceed said upper time interval limit.

11. The management system of claim 7, further comprising an update circuit for providing a plurality of updated signal strengths and updated level crossing rates, and wherein said level crossing rate means determines a time interval based on a current one of said updated level crossing rates when the corresponding updated signal strength is detected to be below said predetermined handoff threshold, and generates said subsequent handoff request if said time interval exceeds said counted elapsing time, and subsequently resets said counter.

12. The management system of claim 11, further comprising a predetermined time duration, and wherein a current one of said updated signal strength is compared with said handoff threshold whenever a preceding one of said updated signal strengths exceeds said handoff threshold and said predetermined time duration exceeds said counted elapsing time.

13. The management system of claim 11, wherein a current one of said updated signal strengths is compared to said handoff threshold whenever a preceding one of said updated signal strengths does not exceed said handoff threshold and said counted elapsing time does not exceed said time interval.

* * * * *

UNITED STATES PATENT AND TRADEMARK OFFICE
CERTIFICATE OF CORRECTION

PATENT NO. : 5,436,956
DATED : Jul. 25, 1995
INVENTOR(S) : Hirofumi Shiotsuki, et al It is certified that error appears in the above-indentified patent and that said Letters Patent is hereby corrected as shown below:

Col. 6, line 54, delete "cersa" and insert --versa--

Col. 7, line 14, delete "(e)" and insert --(d)--

Signed and Sealed this

Second Day of January, 1996

Attest:

BRUCE LEHMAN

*Attesting Officer*     *Commissioner of Patents and Trademarks*